INVENTOR,
Samuel C. Awbrey.
BY
Hovey & Hamilton
ATTORNEYS.

March 1, 1938.  S. C. AWBREY  2,109,520
FURRING STRUCTURE
Filed May 17, 1937  2 Sheets-Sheet 2
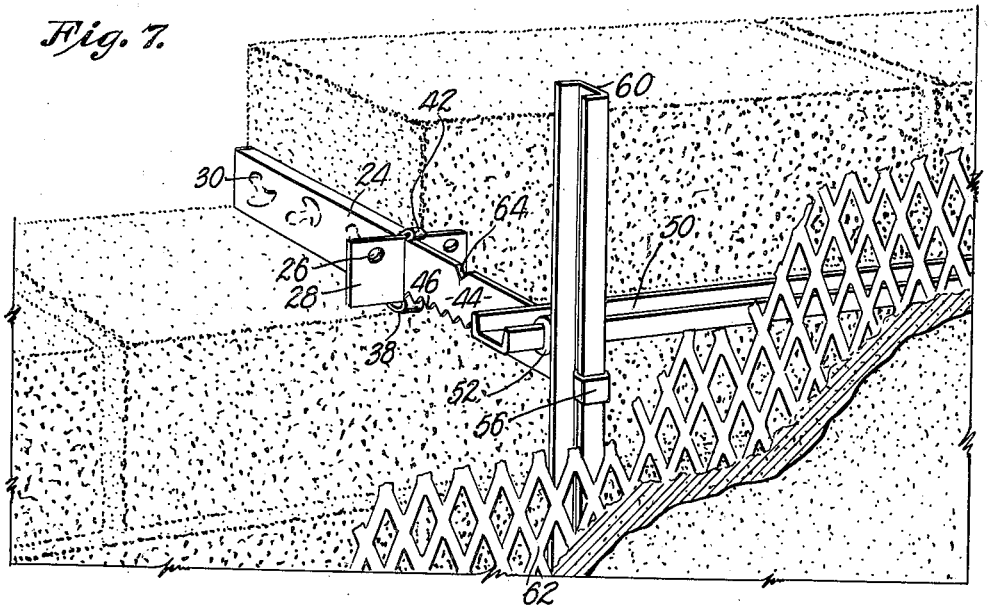
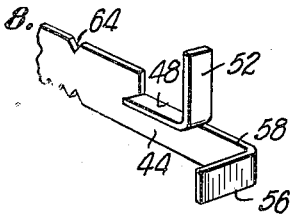
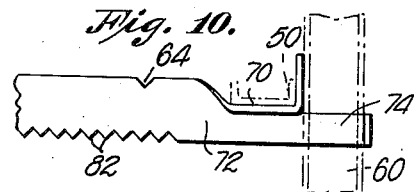
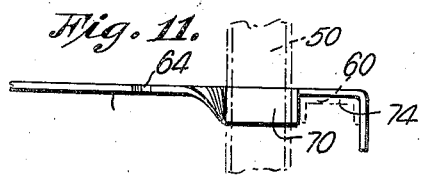
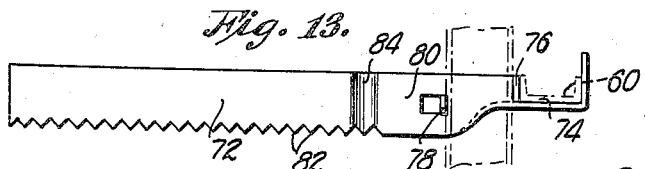
INVENTOR,
Samuel C. Awbrey.
BY
Hovey & Hamilton
ATTORNEYS.

Patented Mar. 1, 1938

2,109,520

UNITED STATES PATENT OFFICE 2,109,520

FURRING STRUCTURE

Samuel C. Awbrey, Kansas City, Mo.

Application May 17, 1937, Serial No. 143,010

6 Claims. (Cl. 72—118)

This invention relates to a furring structure, and particularly to a furring structure suitable for supporting an auxiliary wall in spaced relation to a supporting wall.

The principal object of the present invention is the provision of a furring structure, comprising a shield adapted to be embedded in the supporting wall, a bracket supported in said shield, with one end projecting therefrom and adapted to support and secure furring bars for supporting an auxiliary wall, said shield and bracket having integral means for permitting longitudinal adjustment of the bracket.

Other objects of this invention are simplicity and rigidity of construction, ease of installation, and adjustability whereby a suitable anchorage is provided for a planar secondary wall positioned in spaced relation to the supporting wall.

With these and other obvious objects in view, reference will now be had to the accompanying drawings, wherein:

Fig. 7 is a perspective view, showing the furring structure as used in conjunction with a brick supporting wall.

Fig. 8 is a perspective view of the bracket, partly broken away.

Fig. 9 is a cross sectional view, taken on line IX—IX of Fig. 1.

Figs. 10 and 11 are side and plan views respectively of a modified form of the bracket, with the furring bars shown in dotted lines, and, Figs. 12 and 13 are side and plan views respectively of the bracket, modified to be inserted horizontally in the supporting shield.

Figure 1:
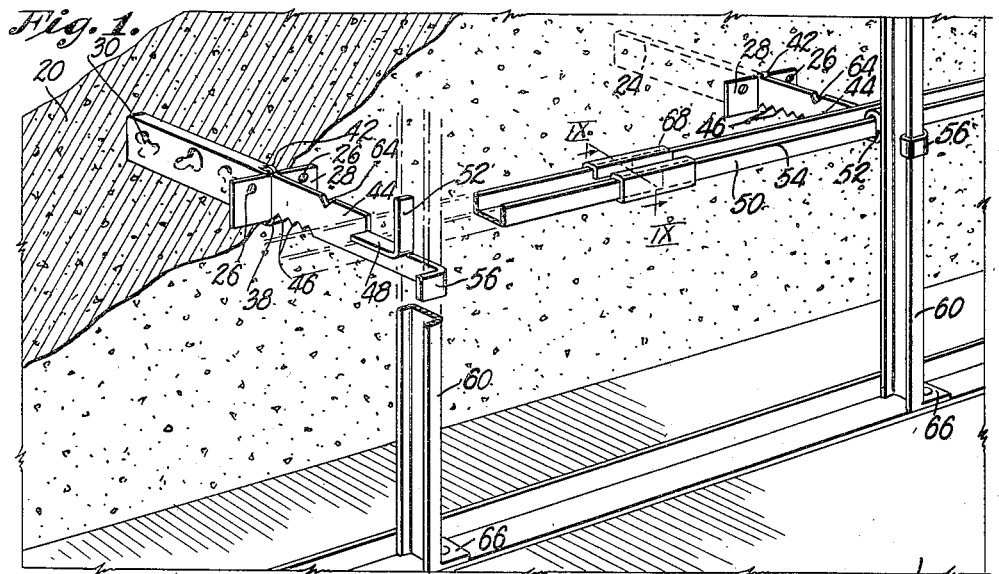
Figure 1 is a perspective view of a concrete supporting wall, with a furring structure in operative relation thereto, embodying this invention.
Figure 2:
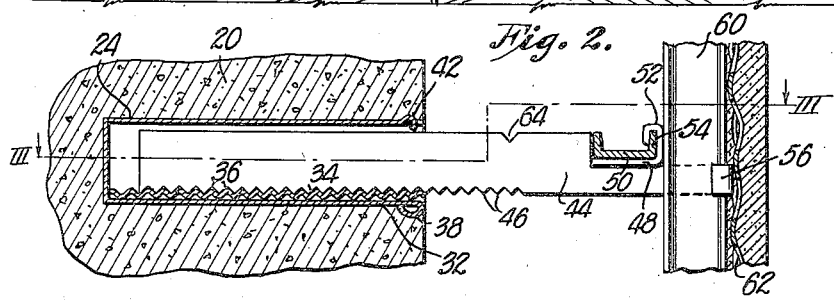
Fig. 2 is an enlarged, fragmentary view of a portion of the furring structure in operative relation with the concrete wall.

Throughout the several views, like reference characters designate similar parts, and the numeral 20 indicates a concrete supporting wall, and 22 is the floor on which the auxiliary wall may be supported. In the use of the present furring construction, the shield 24 is secured to the form wall by means of nails driven through openings 26 formed in wings 28, which extend outwardly at both sides of the shield member. This shield 24 is substantially of a box form, with its outer end open, and is preferably made of sheet metal folded and formed to present a substantially rectangular, cross sectional area. When this shield is positioned on the concrete forms as stated above, and the concrete is poured, the shield will be embedded in the concrete in such a manner that the outer open end thereof will be exposed when the form boards are removed. In order to prevent any displacement of the shield under load, ribs or ridges 30 are formed in the body of the shield 24 to engage the concrete.

Figure 4:
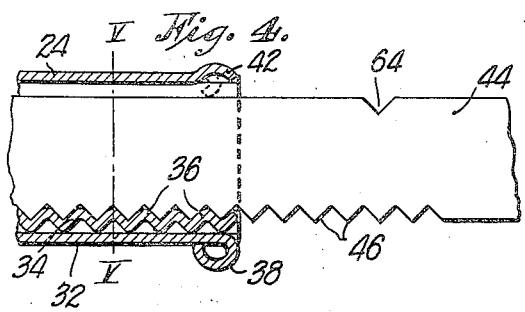
Fig. 4 is an enlarged, fragmentary section of a portion of the shield in section, with the bracket positioned therein.
Figure 5:
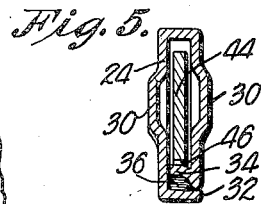
Fig. 5 is a vertical cross section, taken on line V—V of Fig. 4.

Referring now to Figs. 4 and 5, it will be observed that the sheet metal forming said shield is provided with overlapped flanges 32 and 34. The inner flange 34 is formed with regularly spaced transverse ridges 36, which are shown extended the full length thereof, but which may be limited to one or more ridges adjacent the outer end of the shield. A downwardly projecting lip or bead 38 is formed at the bottom outer extremity of the shield and may serve as a support for the shield when the same is placed on a horizontal surface, such as is encountered when used in connection with a brick wall. This slightly tilts the shield and prevents the flow of accumulated moisture into the space intermediate the supporting wall and the auxiliary wall.

Figure 6:
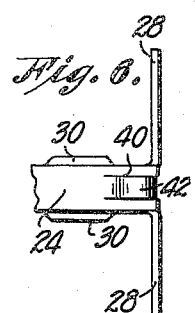
Fig. 6 is an enlarged, fragmentary, plan view of the outer end of the shield.

As shown in Figs. 4 and 6, the upper outer end of the shield 24 is slitted as at 40 to form a tongue 42. This tongue is made in arcuate form and is adapted to be pressed downwardly, as shown in dotted lines in Fig. 4, to serve as a securing means for preventing relative longitudinal movement of the bracket 44 in the shield.

Bracket 44 is preferably made of ribbon stock of a size suitable to be inserted into the shield 24, with a head clearance sufficient to allow the serrations 46 formed in the lower edge thereof to pass over the transverse ridges 36 when adjusting the bracket. Due to the fact that the ordinary concrete wall is not necessarily planar at its surface, and therefore in order to obtain a planar auxiliary wall of uniform thickness, it becomes necessary to adjust these brackets at varying distances from the supporting wall.

The outer end of bracket 44 is slit and formed to present a recess 48 to receive the horizontal bar 50. The tongue 52 forming one side of recess 48 is adapted to extend above said bar and to be folded thereover for the purpose of securing it in the operative position. It will be noted that this bar 50 is of channel shape and that the tongue 52 overlaps the flange 54 thereof. It is very apparent that many other forms of bar might be used without departing from the general plan of securing the parts together.

Figure 3:
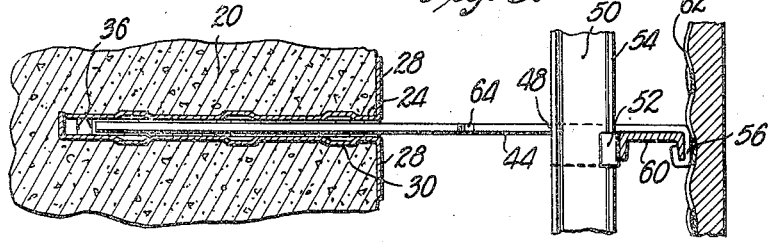
Fig. 3 is a horizontal section, taken on line III—III of Fig. 2.

Extending beyond tongue 52 is an angled finger 56 which, together with said tongue, forms a vertically disposed recess 58 which is adapted to receive a vertical furring bar 60. This furring bar as shown is also of channel shape, and the outer end of finger 56 is adapted to be formed over one of the flanges thereof, as clearly shown in Fig. 3. Expanded metal lath 62 is secured by any suitable means to bar 60, for the reception of a wall material such as plaster, etc.

For the purpose of preventing the flow of water along the bracket 44 along the top edge thereof, a notch 64 is provided in the upper edge thereof above the serrations 46 so that should any water tend to travel along the upper surface of the bracket, it would be directed downwardly at 64 and caused to flow down the sides of the bar to drip from the serrations therebelow. With the serrations extending beyond the shield as shown, it will be impossible for any moisture to flow along the lower edge of the bracket. This precaution is taken to preclude possible moistening of the plaster wall.

In the use of this furring structure, the shield 24 is first embedded in the supporting wall as described above, then the bracket is inserted to the proper depth into the shield and secured against longitudinal movement by forcing the tongue 64 against the upper side of bracket 44. These shields and brackets are provided in the wall structure at definite spaced-apart intervals and in proper alignment so as to receive vertical and horizontal bars 60 and 50 respectively. The outer faces of the vertical bars 60 are positioned in a common plane at a definite distance from the adjacent surface of the supporting wall and serve to support the expanded metal lath 62, which in turn supports the plaster wall.

In most instances, the vertical bars 60 will be provided with an out-turned foot 66, by means of which they are secured to the floor structure 22 of the building. In some instances these vertical bars may be suspended from the ceiling, however, the furring structure will be the same in both instances.

Referring now to Fig. 7, in which the supporting wall is made of brick, it will be observed that the inner end of the shield 24 rests against the upper face of the brick, while the outer end thereof is raised above the surface of the brick and rests on lip 38, thereby slightly tilting the shield inwardly and downwardly from the horizontal position, thus precluding any possible flow of moisture through the shield toward the plaster wall. Due to the fact that in many instances the walls are of considerable length, it is necessary to provide couplings 68, by means of which the bars may be secured in abutting relation. This coupling is clearly shown in Figs. 1 and 9.

In Figs. 10 and 11 a form of bracket is shown, wherein the recess 70 for receiving the horizontal bar is formed without slitting the metal, thereby producing a stronger structure. When the bracket is to be used in a horizontal position, it will be made as clearly shown in Figs. 12 and 13. The body portion 72 is bifurcated at its outer end to produce a vertical recess 74, into which bar 60 is adapted to be fitted and secured, and an upturned tongue 76, which co-operates with the lug 78 to form a horizontal recess 80 for the reception of the horizontal bar is provided. A depression 84 is formed intermediate the ends of this horizontally disposed bar to prevent continuous flow of water therealong.

Tongue 76 is adapted to be formed around one flange of bar 60 to secure the same in position. One edge of the bracket is serrated at 82 to co-operate with the ridges formed in the inner surface of the shield 24. When the shield is to be used with this particular type of bracket, it is cast in the wall in a horizontal position.

It is apparent that with the use of this furring structure a definitely planar plaster wall may be produced, regardless of the inner contour of the supporting wall.

What I claim is:

1. A furring structure for supporting a secondary wall to a supporting wall comprising a shield adapted to be embedded in the supporting wall; spaced-apart, transverse ridges formed inside said shield; a bracket adapted to have its one end portion mounted for longitudinal adjustment in said shield with complementary depressions formed therein registerable with said ridges; means integral with said shield, adjustable to secure said bracket against movement relative to said shield; a horizontal bar carried adjacent the outer end of said bracket; a vertically disposed bar carried by said bracket outside said horizontal bar; and means integral with said bracket bendable to secure said bars in operative positions.

2. A furring structure for supporting a secondary wall to a supporting wall comprising a shield adapted to be embedded in the supporting wall; a bracket having serrations along one of its edges adapted to be partially inserted in said shield; an offset member in said shield adapted to enter the serrations in said bracket; means integral with said shield adjustable to secure said bracket against movement relative to said shield; a horizontal bar carried adjacent the outer end of said bracket; a vertically disposed bar carried by said bracket outside said horizontal bar; and means integral with said bracket bendable to secure said bars in operative positions.

3. A furring structure for supporting a secondary wall to a supporting wall comprising a shield adapted to be embedded in the supporting wall; spaced-apart, transverse ridges formed inside said shield; a bracket adapted to have its one end portion mounted for longitudinal adjustment in said shield with complementary depressions formed therein registerable with said ridges; means integral with said shield adjustable to secure said bracket against movement relative to said shield; a depression formed in the upper contour of said bracket above said serrations; a horizontal bar carried adjacent the outer end of said bracket; a vertically disposed bar carried by said bracket outside said horizontal bar; and means integral with said bracket bendable to secure said bars in operative positions.

4. A furring structure for supporting a secondary wall to a supporting wall comprising a shield adapted to be embedded in the supporting wall; spaced-apart, transverse ridges formed inside said shield; a bracket adapted to have its one end portion mounted for longitudinal adjustment in said shield with complementary depressions formed therein registerable with said ridges; means integral with said shield adjustable to secure said bracket against movement relative to said shield; the outer portion of said bracket being split and formed to present a horizontal and a vertical slot for the reception of a horizontal and vertical bar respectively; and means, integral with said bracket, bendable to overlap and secure said bars in the operative position.

5. A furring structure for supporting a secondary wall in spaced relation to a supporting wall comprising a shield adapted to be embedded substantially horizontally in the supporting wall, said shield being made of a single piece of sheet metal formed to present a box-like structure with outwardly flared wings at its open end, and with overlapped longitudinal edges at its lower side with transverse serrations formed along the inner overlapped edge portion; a bendable tongue formed at the top side of said shield adjacent the open end thereof; a bracket formed to be partially inserted into said shield with a portion thereof engaging said serrations; means for securing said shield and bracket against relative longitudinal movement; and means formed integral with said bracket for securing transverse bars thereto.

6. A furring structure for securing a secondary wall in spaced relation to a supporting wall comprising a shield adapted to be embedded in said supporting wall with the open end thereof exposed at the face of the wall; a bracket adapted to be adjusted longitudinally in said shield; a tongue integral with said shield and bendable to secure said bracket in said shield against longitudinal movement; longitudinally spaced-apart recesses formed in the outer portion of said bracket, said recesses being adapted to receive bars disposed at right angles to each other, and members integral with said bracket adapted to be bent to engage and secure said bars in the operative position.

SAMUEL C. AWBREY.